(12) United States Patent
Zhou et al.

(10) Patent No.: US 11,267,409 B2
(45) Date of Patent: Mar. 8, 2022

(54) JACK BRACKET AND VEHICLE

(71) Applicant: Ford Global Technologies, LLC, Dearborn, MI (US)

(72) Inventors: Han Zhou, Nanjing (CN); Liu Ming, Nanjing (CN); Zhuang Xu, Nanjing (CN); Ge Zhenhong, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 416 days.

(21) Appl. No.: 16/580,177

(22) Filed: Sep. 24, 2019

(65) Prior Publication Data

US 2020/0148134 A1 May 14, 2020

(30) Foreign Application Priority Data

Nov. 14, 2018 (CN) .......................... 201811351904.3

(51) Int. Cl.
*B60R 11/06* (2006.01)
*B60R 11/00* (2006.01)

(52) U.S. Cl.
CPC ....... *B60R 11/06* (2013.01); *B60R 2011/0059* (2013.01); *B60R 2011/0063* (2013.01); *B60R 2011/0071* (2013.01)

(58) Field of Classification Search
CPC ............. B60R 11/06; B60R 2011/0059; B60R 2011/0071; F16M 13/02
See application file for complete search history.

(56) References Cited

U.S. PATENT DOCUMENTS

| 4,750,774 A | 6/1988 | Pickering | |
| 4,838,512 A * | 6/1989 | Lisak | B25B 5/10 |
| | | | 248/503 |
| 5,098,126 A * | 3/1992 | Kanke | B60R 11/06 |
| | | | 248/503 |

(Continued)

FOREIGN PATENT DOCUMENTS

| CN | 203844683 U | 9/2014 |
| CN | 105620381 A | 6/2016 |
| FR | 3035629 | 6/2017 |

OTHER PUBLICATIONS

Jack VW Golf VII 5Q0011031B, Audivw24.co.uk Car Parts, 2018, 3 pages, <https://www.audivw24.co.uk/product-eng-28760-JACK-VW-GOLF-VII-5Q0011031B.html>.

(Continued)

*Primary Examiner* — Jason S Morrow
(74) *Attorney, Agent, or Firm* — Raymond Coppiellie; Price Heneveld LLP

(57) ABSTRACT

A jack bracket is provided. The jack bracket comprises a bracket base including a first side and a second side opposite the first side, a flexible strap having a first end portion coupled to the first side and a second end portion opposite the first end portion, and a lock assembly configured to couple the second end portion of the flexible strap to the second side of the bracket base. The flexible strap further includes a connection member disposed between the first end portion and the second end portion. The connection member is selectively attached to a vehicle part and selectively released from the vehicle part. The jack bracket of the present disclosure allows for removal and installation of a jack in a simple and fast manner in a limited space.

20 Claims, 4 Drawing Sheets

(56) References Cited

U.S. PATENT DOCUMENTS

| | | | |
|---|---|---|---|
| 5,104,170 A | 4/1992 | Rich | |
| 6,227,428 B1 * | 5/2001 | Lewis | B60R 11/06 224/402 |
| 6,230,949 B1 * | 5/2001 | O'Connell | B60R 11/06 206/349 |
| 6,634,688 B2 * | 10/2003 | Foat | B60R 11/06 224/42.4 |
| 9,399,434 B2 * | 7/2016 | Kennedy | B60R 11/06 |
| 9,616,818 B1 * | 4/2017 | Zambrano | B60R 11/06 |
| 9,821,729 B2 | 11/2017 | Zhou et al. | |
| 10,471,907 B2 * | 11/2019 | Zhou | F16M 13/02 |
| 10,953,818 B2 * | 3/2021 | Graham | B60R 11/06 |
| 2006/0016839 A1 * | 1/2006 | Edwards | B60R 11/06 224/42.13 |
| 2020/0148134 A1 * | 5/2020 | Zhou | B66F 3/12 |

OTHER PUBLICATIONS

Mahindra TUV 300 Owners Manual, 2018, 89 pages, <https://www.withyouhamesha.com/owner-manual/TUV300/owners-manual-TUV300.html>.

* cited by examiner

![US 11,267,409 B2]

JACK BRACKET AND VEHICLE

FIELD OF THE INVENTION

The present disclosure generally relates to a jack bracket and a vehicle.

BACKGROUND OF THE INVENTION

A jack is widely used in various situations, such as used to lift a vehicle. The jack is compact and can lift a heavy load without a great force applied by a user. When not in use, the jack is typically stowed under a spare tire in a trunk of a vehicle. In some vehicles, the jack is placed between a vehicle back seat and a rear trim panel of the vehicle. It can be difficult to take the jack out from the vehicle and place the jack back into the vehicle because of a small packaging space between the vehicle back seat and the rear trim panel of the vehicle.

SUMMARY OF THE INVENTION

According to a first aspect of the present disclosure, a jack bracket is provided. The jack bracket comprises a bracket base including a first side and a second side opposite the first side, a flexible strap to secure a jack, and a lock assembly. The flexible strap includes a first end portion coupled to the first side and a second end portion opposite the first end portion, and a connection member disposed between the first end portion and the second end portion. The connection member is selectively attached to a vehicle part and is selectively released from the vehicle part. The lock assembly is configured to connect the second end portion of the flexible strap to the second side of the bracket base.

In one embodiment, the flexible strap includes a first surface, which is an inner surface if the jack is secured, and a second surface opposite the first surface, and the connection member is positioned on the second surface. The flexible strap is capable of being connected to the vehicle part via the connection member when the jack is installed on the bracket base, and the connection member is released from the vehicle part to free the flexible strap for the flexible strap to secure the jack when the jack is placed on the bracket base.

In another embodiment, the connection member is a hook part of a hook-and-loop fastener and is configured to connect with a loop part of the hook-and-loop fastener.

In another embodiment, the connection member is a protrusion part or a recessed part of a clip connector.

In another embodiment, the bracket base further includes a first arm extending from the first side substantially in a direction of a height of the first side and a second arm extending from the second side substantially in the direction of the height and opposite the first arm. The first arm and the second arm define a width of an opening to receive the jack.

In another embodiment, the lock assembly includes a thread bolt connected to the second end portion of the flexible strap and a thread hole on the second arm for securing the jack.

In another embodiment, the lock assembly further includes a connection plate disposed on the second end portion of the flexible strap to connect the second end portion of the flexible strap to the thread bolt.

In another embodiment, the lock assembly further includes an elastic member disposed between the connection plate and a head of the thread bolt to provide pretension for the flexible strap.

In another embodiment, the connection plate includes a first plate portion having an aperture and a second plate portion having a through hole and having an angle with the first plate portion. The second end portion of the flexible strap is connected to the aperture and the thread bolt passes the through hole of the second plate portion to enable relative movement between the connection plate and the thread bolt.

In another embodiment, the thread bolt includes a head and a rod extending from the head. The rod includes a thread portion, and a first stop and a second stop between the head and the thread portion. The elastic member is disposed between the first stop and the second plate portion. The second plate portion is disposed between the elastic member and the second stop.

In another embodiment, the first stop is an enlarged portion, and the second stop is a clip pin or a clip ring, and the first plate portion is substantially perpendicular to the second plate portion.

In another embodiment, the first arm and the second arm are made from a metallic material and the flexible strap is made from a fabric material such as Nylon.

In another embodiment, a head of the thread bolt further includes a pair of wings and a torque slot between the pair of wings.

According to another aspect of the present disclosure, a jack bracket for a vehicle is provided. The jack bracket for a vehicle comprises a bracket base including a first side and second side opposite the first side, a first arm extending from the first side of the bracket base in substantially a height direction of the first side, a second arm extending from the second side in substantially the height direction and opposite the first arm, a flexible strap, and a lock assembly. The flexible strap includes a first end portion connected to the first arm, a second end portion opposite the first end portion, a first surface that is an inner surface that faces a trim panel when a jack is secured, a second surface opposite the first surface, and a connection member disposed on the second surface. The lock assembly is configured for coupling the second end portion of the flexible strap to the second arm of the bracket base. The flexible strap is attached to a vehicle part opposite the first arm via the connection member when the jack is taken out or installed to facilitate an installation and removal of the jack.

In another embodiment, the connection member is a hook part of a hook-and-loop fastener, or a protrusion or a recessed part of a clip connector, and is configured to connect with a corresponding loop part of the hook-and-loop fastener or a corresponding recessed part or a protrusion of the clip connector on the vehicle part.

In another embodiment, the jack bracket further comprises a support disposed on the bracket base, in which the support is made from a foam. An outer profile of the support has a contour corresponding to and matching with sides of the jack.

In another embodiment, the lock assembly includes a thread bolt connected to the second end portion of a flexible strap and a thread hole on the second arm. The lock assembly further includes a connection plate to connect the thread bolt to the second end portion of the flexible strap and an elastic member between the connection plate and the thread bolt to provide pretension for the flexible strap.

According to yet another aspect of the present disclosure, a vehicle comprises a vehicle part having a surface in a height direction of the vehicle part, and a jack bracket adjacent to the surface. The jack bracket comprises a bracket base including a first side adjacent to the vehicle part and second side opposite the first side, a first arm extending from the first side of the bracket base in a direction substantially along the height direction and adjacent to the surface of the vehicle part, and a second arm extending from the second side of the bracket base in the direction substantially along the height direction and opposite the first arm. The vehicle also includes a flexible strap and a lock assembly. The flexible strap includes a first end portion connected to the first arm, a second end portion opposite the first end portion, a first surface facing a jack if secured to the jack and a second surface opposite the first surface, and a connection member disposed on the second surface. The connection member is selectively attached to and released from the vehicle part. The lock assembly is configured to couple the second end portion of the flexible strap to the second arm of the bracket base. The flexible strap is capable of being connected to the vehicle part via the connection member responsive to the jack being placed to the jack bracket or the jack is taken from the jack bracket to facilitate a user to place the jack or take out the jack. The flexible strap is releasable from the surface of the vehicle part to secure the jack.

In yet another embodiment, the vehicle part is a rear trim panel, the connection member is a hook part of a hook-and-loop fastener. The surface of the rear trim panel includes a loop part of the hook-and-loop fastener, and the hook part is released from the loop part under an external force.

In another embodiment, the lock assembly includes a thread bolt connected to the second end portion of the flexible strap and a thread hole disposed on the second arm, and an elastic member connected with the thread bolt.

These and other aspects, objects, and features of the present invention will be understood and appreciated by those skilled in the art upon studying the following specification, claims, and appended drawings.

DETAILED DESCRIPTION OF THE PREFERRED EMBODIMENTS

The application discloses the embodiments of the present disclosure based on the needs. However, it should be understood that the disclosed embodiments are only exemplary embodiments and can be implemented by various alternatives. The figures are not drawn in scale and some features may be enlarged or reduced to show the details of specific components of parts. Hence, the structures and functions disclosed should not be interpreted as limiting but for teaching the technicians in the art to implement the present disclosure with various embodiments.

In some vehicles, such as a pickup, a jack is typically installed on a jack bracket between a vehicle back seat and a rear trim panel. Because of the narrow space at this place, it can be difficult to take out the jack and place the jack on the jack bracket. For example, one hand is needed to hold an arm of a jack bracket to expose the storage space and another hand is used to hold the jack when storing the jack and taking the jack out. One-handed operation is not convenient. The present disclosure provides a jack bracket that makes the jack easy to store and take out from a limited space, such as between a vehicle back and a rear trim panel. The jack bracket comprises a bracket base comprising a first side and a second side, a flexible strap having a first end coupled to the first side and a second end opposite the first end, and a locking assembly to connect the second end of the flexible strap to the second side of the bracket base. The flexible strap further includes a connection member disposed between the first end and the second end. The connection member is selectively attached or detached from a vehicle part. The jack bracket of the present disclosure enables quick and easy placement and removal of the jack from the limited space.

Figure 1:
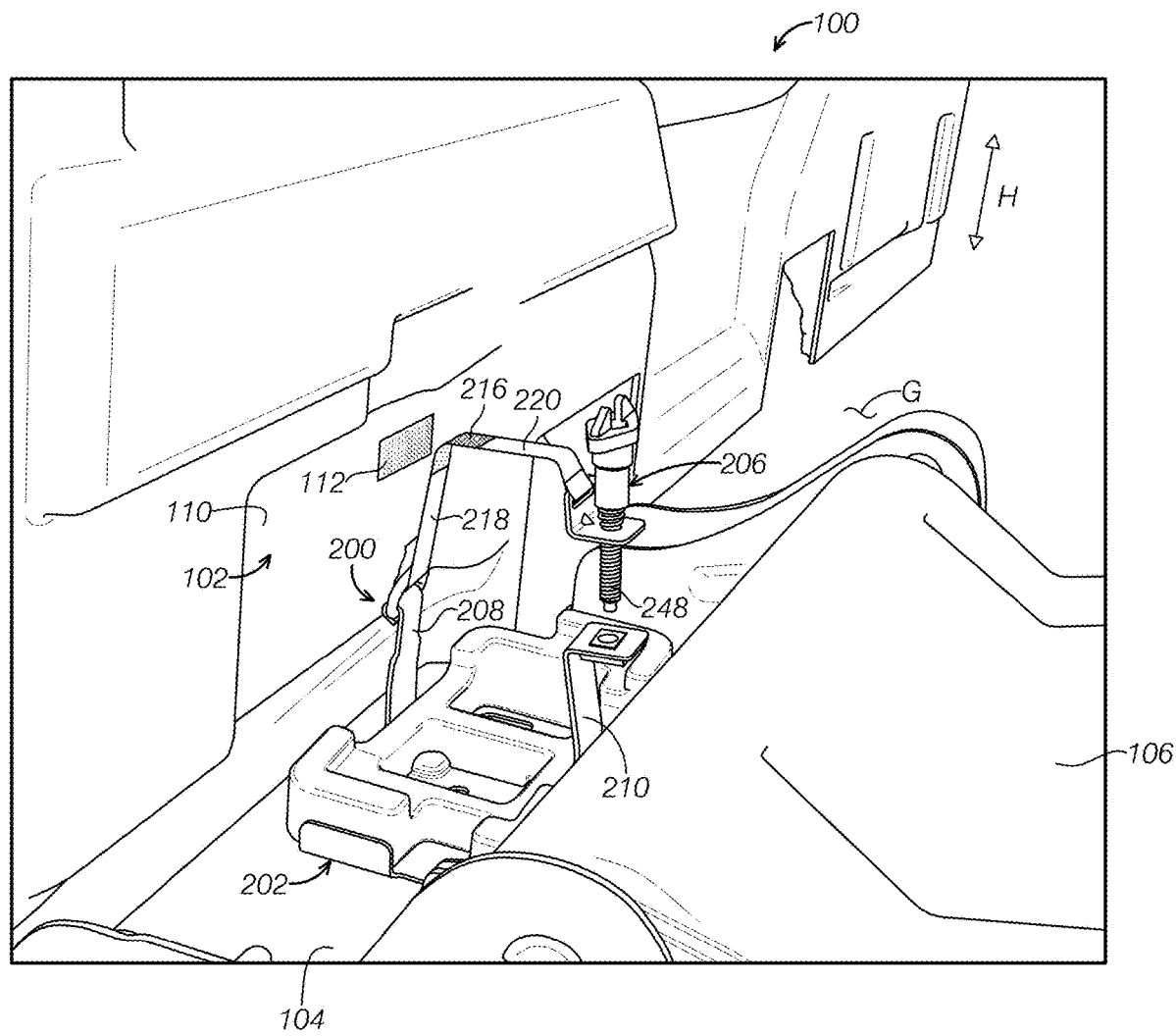
FIG. 1 is a partial schematic view of a vehicle, illustrating a jack bracket installed on a vehicle floor according to one or more embodiments of the present disclosure.

FIG. 1 is a partial view of a vehicle 100, according to one or more embodiments of the present disclosure, illustrating a jack bracket 200 mounted in the vehicle 100. In one or more embodiments, the vehicle 100 includes a vehicle part 102 as a rear trim panel 102, a vehicle floor 104, and a seat back 106. The rear trim panel 102 has a surface 110. The rear trim panel 102, the vehicle floor 104, and the seat back 106 collectively form a space G extending in a vehicle height direction H. To effectively use the space G, the jack bracket 200 of the present disclosure is disposed adjacent to the rear trim panel 102, and between the rear trim panel 102 and the seat back 106. The jack bracket 200 may be mounted to the vehicle floor 104 via any appropriate approaches, such as welding and bolt/nut connection, by fixing a bracket base 202 to the vehicle floor 104. Although the jack bracket 200 is illustrated to be adjacent to the rear trim panel 102 and mounted between the rear trim panel 102 and the seat back 106, it should be appreciated that the jack bracket may be disposed adjacent to other vehicle parts.

Figure 2:
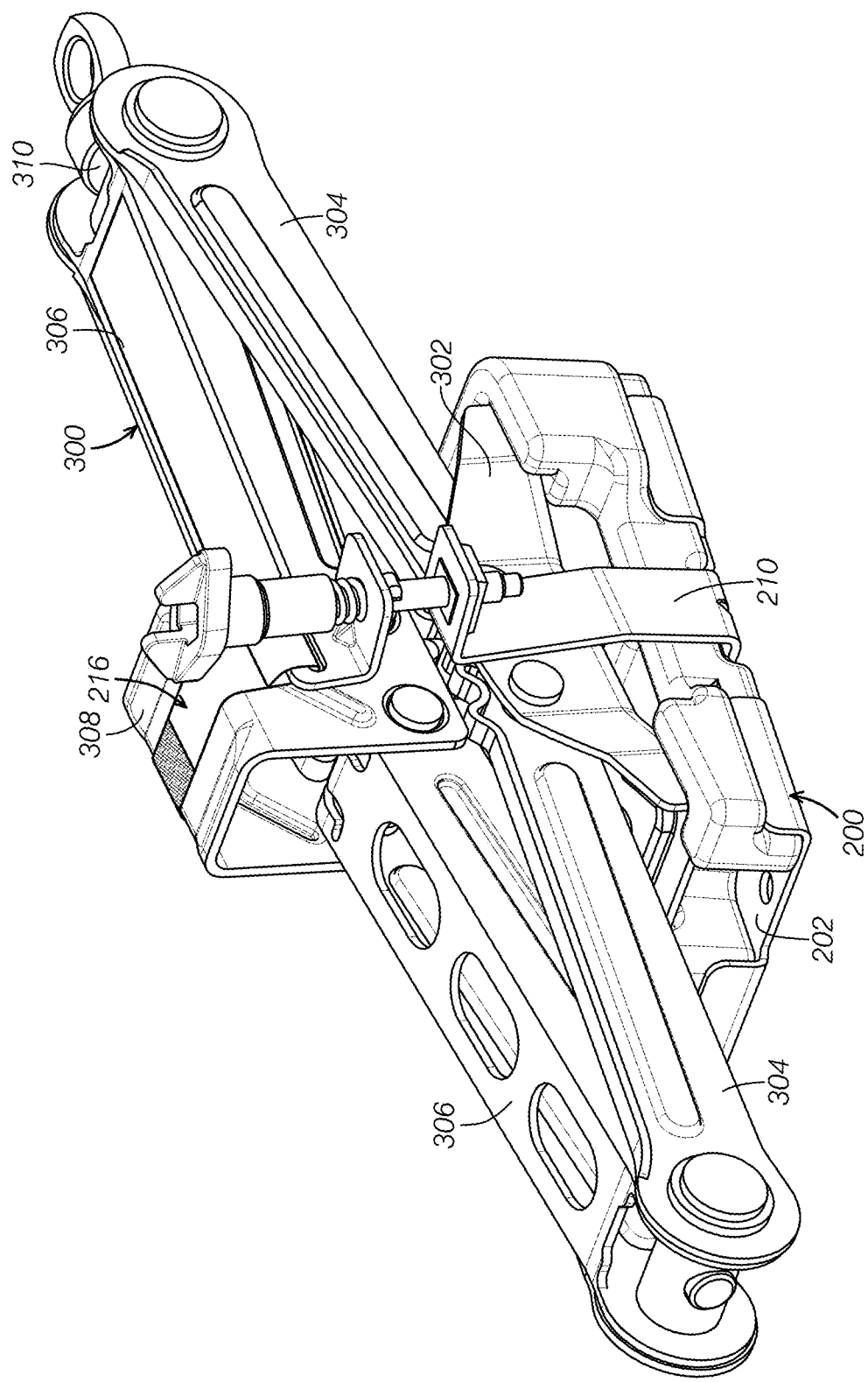
FIG. 2 is the jack bracket in FIG. 1 and illustrates a jack mounted on the bracket.

Referring to FIG. 2, a schematic view of the jack bracket 200 mounted with a jack 300 is depicted. In one or more embodiments, the jack 300 may be a scissor jack. The jack 300 comprises a base 302, a pair of lower arms 304 connected to the base 302, a pair of upper arms 306 connected to the pair of lower arms 304, a loading stand 308, and a lead screw rod 310 connected to the pair of lower arms 304 and the pair of upper arms 306 for adjusting a height of the loading stand 308. The jack 300 is illustrated as a scissor jack. It should be appreciated that the jack bracket 200 may be other types of jacks, such as a hydraulic jack.

Figure 3:
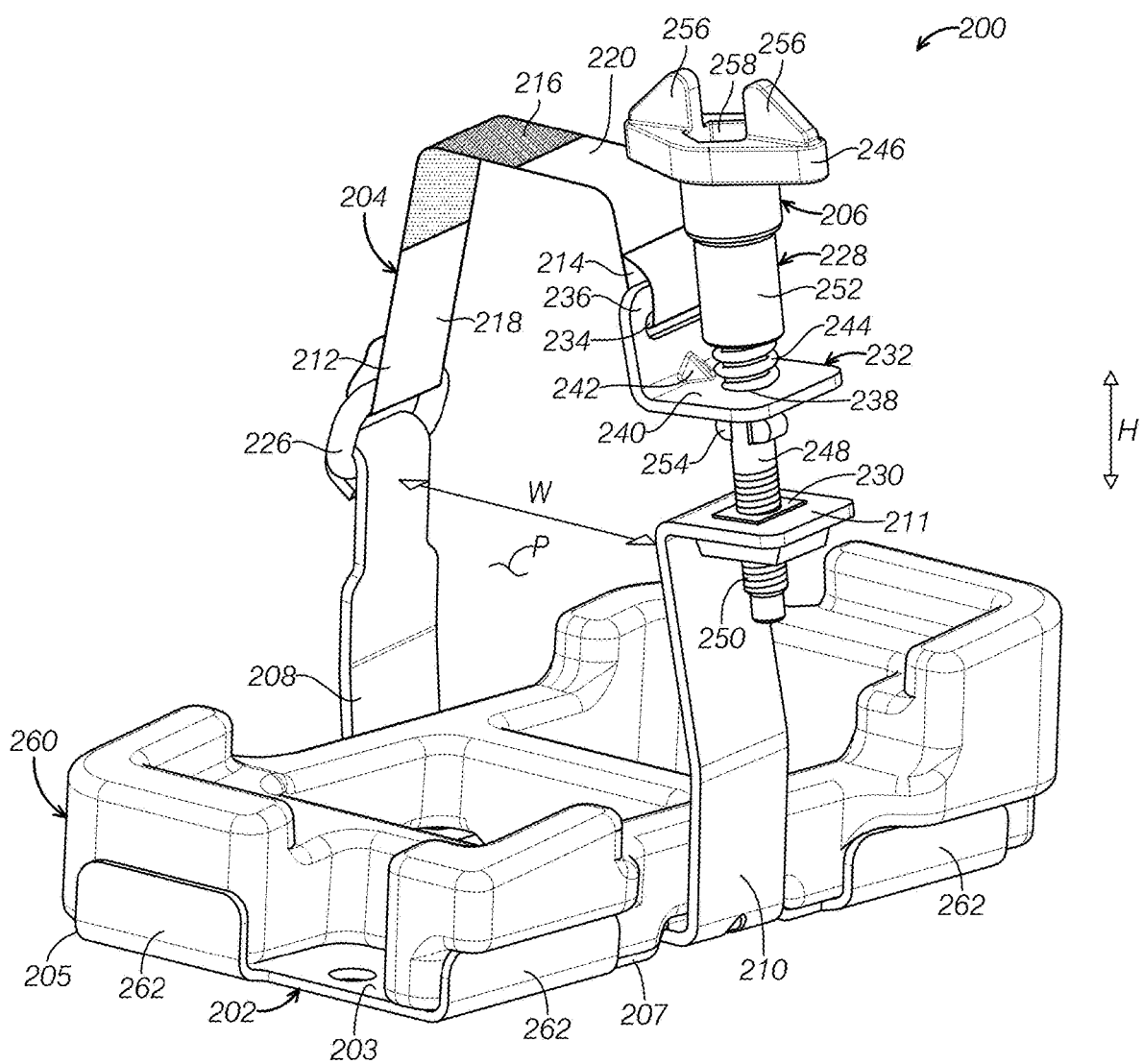
FIG. 3 is a perspective view of the jack bracket in FIG. 1.

Referring to FIG. 3, a perspective view of the jack bracket 200 in FIG. 1 is depicted. In one or more embodiments, the jack bracket 200 comprises a bracket base 202 to support the base 302 of the jack bracket 200. The bracket base 202 has a main surface 203, a first side 205, and a second side 207 opposite the first side 205. In one or more embodiments, the bracket base 202 includes a first arm 208 extending from the first side 205 of the bracket base 202 and a second arm 210 extending from the second side 207. The first arm 208 is opposite the second arm 210. In one or more embodiments, at least a portion of the first arm 208 extends along the height direction H and adjacent the vehicle part 102. In the embodiment depicted in FIG. 1, the first arm 208 is adjacent to the rear trim panel 102 and opposite to the surface 110 of the rear trim panel 102. In one or more embodiments, the first arm 208 and the second arm 210 may be a thin plate. In one or more embodiments, the first arm 208 and the second arm 210 may be made from metallic material. Of course, the first arm 208 and the second arm 210 may be made from any appropriate material, such as hard plastic, if strength requirements are met. In one or more embodiments, the first arm 208 and the second arm 210 may be integrally formed with the bracket base 202. In other embodiments, the first arm 208 and the second arm 210 may be connected to the bracket base 202 via fasteners, or via welding for other connection approaches.

The bracket base 202 further includes a flexible strap 204 and a lock assembly 206 connected to the flexible strap 204. The flexible strap 204 includes a first end portion 212 connected to the first side 205 of the bracket base 202 or the first arm 208, and a second end portion 214 opposite the first end portion 212. In one or more embodiments, the lock assembly 206 connects the second end portion 214 of the flexible strap 204 to the second side 207 of the bracket base 202, or the second arm 210. In one or more embodiments, the flexible strap 204 may be made from Nylon. Of course, it should be appreciated that the flexible strap 204 may be made from any appropriate flexible material.

The flexible strap 204 may further include a connection member 216 disposed between the first end portion 212 and the second end portion 214. The connection member 216 may be selectively attached to and released from the rear trim panel 102. The connection member 216 may be a portion of a connector (not shown) that is easily connected to and released from the vehicle part 102. In this way, the user can use the connection member 216 to connect the flexible strap 204 to the vehicle part 102 or release the flexible strap 204 from the vehicle part 102 manually without the need for a tool.

Referring to FIGS. 2-3 and with further reference to FIG. 1, in one or more embodiments, the flexible strap 204 includes a first surface 218, which is an inner surface at a use position, and a second surface 220 opposite the first surface 218. The use position is a position where the flexible strap 204 is secured on the jack. In the use position, the first surface 218 faces the jack 300. The second surface 220 is an outer surface or faces away from the jack 300 in the use position. The connection member 216 may be positioned on the second surface 220. In one or more embodiments, the connection member 216 may be a hook part of a hook-and-loop fastener (a Velcro® fastener). The connection member 216 may be connected to the flexible strap 204 with any appropriate approaches. For example, the hook part may be sewn to the flexible strap 204. In one embodiment, the surface of the rear trim panel 102 may be configured to have a loop part of the hook-and-loop fastener. When placing the jack 300 or taking the jack 300 from the jack bracket 200, a user can attach the portion of the flexible strap 204 having the connection member 216 to the loop part 112 on the surface 110 of the vehicle part. The hook-and-loop fastener 216, being the connection member 216 and the loop part 112 are connected temporarily by pressing each other. When the flexible strap 204 is needed to secure the jack, the user can pull the flexible strap 204 away from the surface 110 of the vehicle part.

In one embodiment, the surface 110 of the rear trim panel 102 may be a fabric material. The hook part may be connected to the fabric material by applying pressure without the need for a loop part on the surface 110.

It should be appreciated that the connection member 216 may be any appropriate connector or fastener that is easy to attach and easy to release. The connection member 216 may be disposed on any appropriate location on the flexible strap 204. For example, the connection member 216 may be positioned on the first surface 218 of the flexible strap 204. The flexible strap 204 may be folded to enable the connection member 216 to face the corresponding connection member on the vehicle part and is connected to the vehicle part. In another embodiment, the connection member 216 may be a ring-shaped component or a hook positioned on a side of the flexible strap 204 to connect with a corresponding hook and ring-shaped component on the vehicle part 102, respectively.

Continuing with FIGS. 1-3, in one or more embodiments, when it is necessary to take out the jack 300, the lock assembly 206 is unlocked first and the flexible strap 204 is connected to the rear trim panel 102 via the connection member 216. In this way, the user can operate the jack 300 with two hands because there is no need to hold the flexible strap 204 to expose the space G. When it is necessary to place the jack 300 back, the flexible strap 204 would not interfere because the flexible strap 204 is fixed to the rear trim panel 102. Thus, the user can place the jack 300 back using two hands. When the jack 300 is placed on the bracket base 202, the flexible strap 204 is released from the rear trim panel 102 such that the jack 300 can be secured by the flexible strap 204, and the first arm 208 and the second arm 210 via the lock assembly 206. Thus, the user can install or secure the jack 300 easily and rapidly via disposing the connection member 216 on the flexible strap 204. Further, the flexible strap 204 can stay close to the jack 300 and thus occupy less space.

In one or more embodiments, the first arm 208 and the second arm 210 extend substantially in a first direction H, which define a width W of an opening P to receive the jack 300. "Substantially extending in the first direction or in a height direction H" refers to at least a portion of the first arm 208 and the second arm 210 to form an angle with the first direction H of approximately 0 degrees or an angle of 0-15 degrees. The first end portion 212 of the flexible strap 204 is connected to the first arm 208, and the second end portion 214 is connected to the lock assembly 206. In one or more embodiments, the heights of the first arm 208 and the second arm 210 of the bracket base 202 may be configured according to the needs. In one example, the height may be 5-20 centimeters, but is not limited to this range. In one or more embodiments, the first end portion 212 of the flexible strap 204 is connected to a top of the first arm 208 via a ring 226. In other embodiments, the first end portion 212 of the flexible strap 204 may be connected to the first arm 208 via other approaches. For example, a through hole may be formed on the top of the first arm 208 and the first end portion 212 of the flexible strap 204 may pass through the through hole and be connected to the first arm 208.

The lock assembly 206 includes a thread bolt 228 to be connected with the second end portion 214 of the flexible strap 204 and a thread hole 230 formed on the second arm 210. The second arm 210 may include a connecting portion 211 disposed at a free end. The connecting portion 211 may form an angle, such as, but not limited to, 90 degrees with the second arm 210. The connecting portion 211 may be formed integrally with the second arm 210. The thread hole 230 is located on the connecting portion 211. The lock assembly 206 connects the flexible strap 204 and the second arm 210, and thus secures the jack 300 on the jack bracket 200. In one or more embodiments, the lock assembly 206 further includes a connection plate 232 for coupling the second end portion 214 of the flexible strap 204 to the thread bolt 228. The connection plate 232 includes a first plate portion 236 having an aperture 234 and a second plate portion 240 having an angle with the first plate portion 236 and defining a through hole 238. In one or more embodiments, the first plate portion 236 is substantially perpendicular to the second plate portion 240. Of course, the angle between the first plate portion 236 and the second plate portion 240 may be configured according to needs. To increase the strength of the connection plate 232, a reinforcement part 242 may be formed in a corner of the first plate portion 236 and the second plate portion 240. In one or more embodiments, the reinforcement part 242 may be formed via welding. In other embodiments, the reinforcement part 242 may be formed via stamping. In the use state, the second plate portion 240 is opposite the connecting portion 211 on the second arm 210.

The second end portion 214 of the flexible strap 204 is connected to the aperture 234 of the first plate portion 236. That is, the flexible strap 204 is connected to the connection plate 232 by passing its second end portion 214 through the aperture 234. The thread bolt 228 passes through the hole 238 on the second plate portion 240 to enable relative movement between the connection plate 232 and the thread bolt 228.

In one or more embodiments, the lock assembly 206 further includes an elastic member 244 disposed between the connection plate 232 and the thread bolt 228 to provide a pre-tension for the flexible strap 204. In one embodiment, the elastic member 244 is a spiral spring. Of course, in other embodiments, the elastic member 244 may be any appropriate part that can provide an elastic force and certain strength, such as elastic sleeves. Additionally, or alternatively, the elastic member 244 may be made from any appropriate materials, such as metal, rubber, or polymer materials.

The thread bolt 228 may include a head 246 and a rod 248 extending from the head 246. The rod 248 includes a thread portion 250, a first stop 252, and a second stop 254 positioned between the head 246 and the thread portion 250. The elastic member 244 may be disposed between the first stop 252 and the second stop 254. In one or more embodiments, the first stop 252 is an enlarged portion (i.e., has a diameter greater than those of the rod 248 and the elastic member 244) and the second stop 254 may be a clip pin or a clip ring. Of course, it should be appreciated that the first stop 252 and the second stop 254 may have any appropriate shape depending on the needs as long as the first stop 252 and the second stop 254 can restrict the elastic member 244 in-between the connection plate 232.

Referring to FIG. 3 and with further reference to FIG. 2, the flexible strap 204 crosses the loading stand 308 of the jack 300 when the jack 300 is secured. As the thread bolt 228 passes through the thread hole 230 on the second arm 210 of the bracket base 202, the thread portion 250 is engaged with the thread hole 230. When the thread bolt 228 is rotated continuously to move down, the elastic member 244 between the connection plate 232 and the thread bolt 228 can provide certain pretension force to the flexible strap 204. In this way, the pretension can compensate height variations even if the height of the jack 300 has some variations in the first direction H, thus avoiding noises resulted from loose movement between the jack 300 and jack bracket 200. Further, the rigidity of the elastic member 244 may be configured according to the needs. In one or more embodiments, the head 246 of the thread bolt 228 may include a pair of wings 256 for the user to apply the torque to the thread bolt 228 with the hands. Further, the head 246 of the thread bolt 228 may include a torque slot 258 between the wings 256.

In one or more embodiments, the jack bracket 200 may further include a support 260 made from foam and disposed on the bracket base 202 to reduce vibration for the jack 300. The bracket base 202 may include at least one tab to limit the movement of the support 260.

Figure 4:
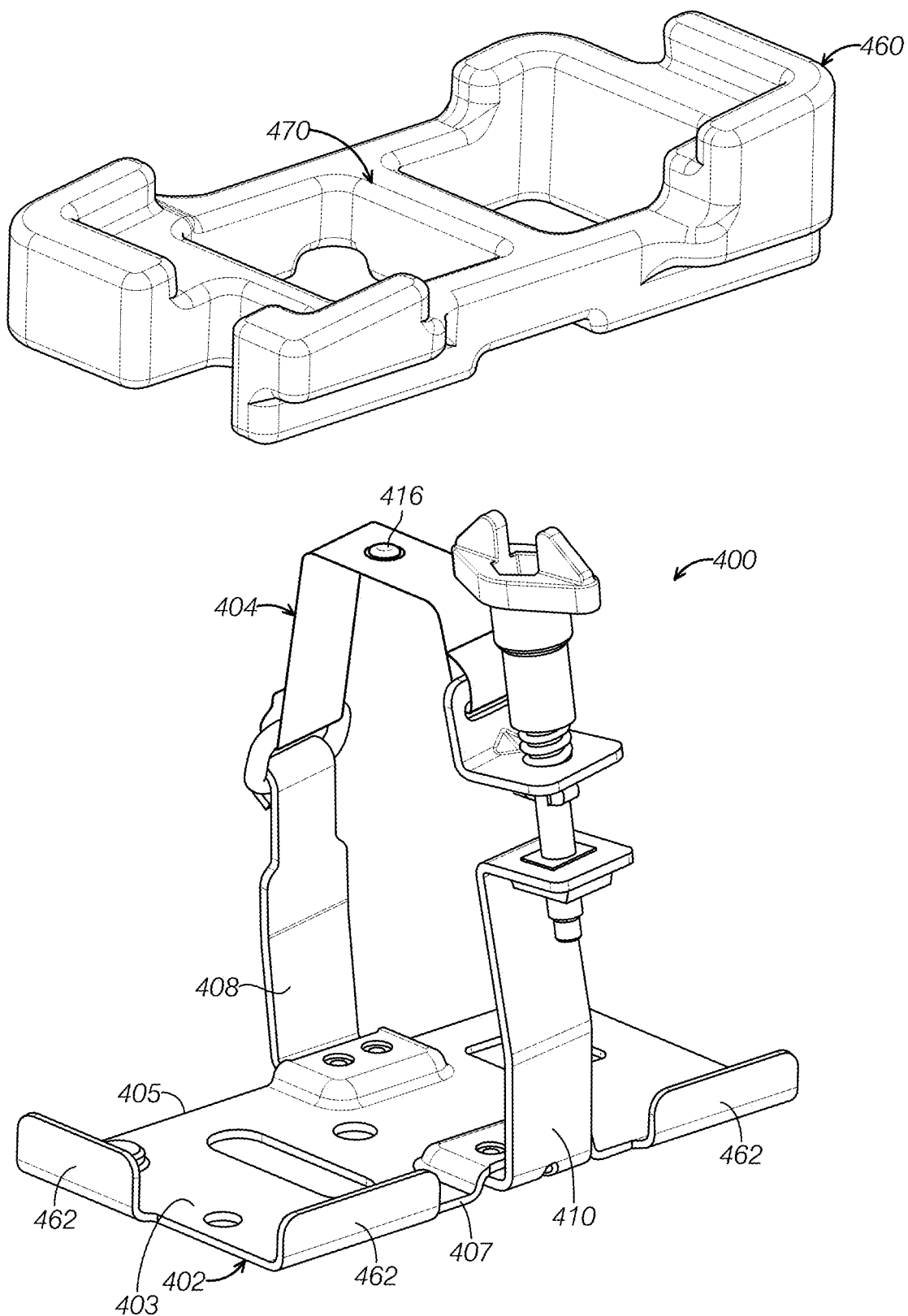
FIG. 4 is an exploded view of a jack bracket according to another embodiment of the present disclosure.

Referring to FIG. 4, FIG. 4 is an exploded perspective view of a jack bracket 400, according to another embodiment of the present disclosure. In this embodiment, the jack bracket 400 is similar to the jack bracket 200 and the same parts are not described in detail. The jack bracket 400 comprises a bracket base 402, a first side 405, and a second side 407 opposite the first side 405. The jack bracket 400 may further include a first arm 408 extending from the bracket base 402 substantially in a height direction, a second arm 410 extending from the bracket base 402 substantially in the height direction, and a flexible strap 404 connected with the first arm 408 and the second arm 410. The difference of the jack bracket 400 from the jack bracket 200 is the connection member 416 disposed on the flexible strap 404. In one or more embodiments, the connection member 416 is a protrusion part or a recessed part of the clip connector. Correspondingly, the rear trim panel 102 includes a recessed part or the protrusion part mating with the connection member. It should be appreciated that the connection members 216, 416 illustrated are exemplary. Any appropriate connection members may be used for attaching and releasing the flexible strap 204, 404 with the rear trim panel 102 or other vehicle parts in a simple and fast manner. FIG. 4 further illustrates a support 460. The support 460 is configured to be placed on the bracket base 402. The jack bracket 400 may include a tab 462 to restrict the lateral movement of the support 460. The support 460 may be made from foam or similar materials. The outer profile of the support 460 may correspond to the side contour of the jack to accommodate the jack.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A jack bracket, comprising:
   a bracket base including a first side and a second side opposite the first side;
   a flexible strap for securing a jack, wherein the flexible strap includes a first end portion coupled to the first side and a second end portion opposite the first end portion, and a connection member disposed between the first end portion and the second end portion, and wherein the connection member is selectively attached to a vehicle part and selectively released from the vehicle part; and
   a lock assembly configured to couple the second end portion of the flexible strap to the second side of the bracket base.

2. The jack bracket of claim 1, wherein the flexible strap includes a first surface and a second surface opposite the first surface, and the connection member is positioned on the second surface, the flexible strap being connectable to the vehicle part via the connection member responsive to the jack being installed on the bracket base, and the connection member is released from the vehicle part to free the flexible strap to secure the jack responsive to the jack being placed on the bracket base.

3. The jack bracket of claim 2, wherein the connection member is a hook part of a hook-and-loop fastener and configured to connect with a loop part of the hook-and-loop fastener on the vehicle part.

4. The jack bracket of claim 2, wherein the connection member is a protrusion part or a recessed part of a clip connector.

5. The jack bracket of claim 1, wherein the bracket base further includes a first arm extending from the first side substantially in a height direction and a second arm extending from the second side substantially in the height direction and opposite the first arm, the first arm and the second arm define a width of an opening to receive the jack.

6. The jack bracket of claim 5, wherein the lock assembly includes a thread bolt connected to the second end portion of the flexible strap and a thread hole on the second arm for securing the jack.

7. The jack bracket of claim 6, wherein the lock assembly further includes a connection plate disposed on the second end portion of the flexible strap that connects the second end portion of the flexible strap to the thread bolt.

8. The jack bracket of claim 7, wherein the lock assembly further includes an elastic member disposed between the connection plate and a head of the thread bolt to provide pretension for the flexible strap.

9. The jack bracket of claim 8, wherein the connection plate includes a first plate portion having an aperture and a second plate portion having a through hole and defined at an angle with the first plate portion, the second end portion of the flexible strap being connected to the aperture such that the thread bolt passes the through hole of the second plate portion to enable relative movement between the connection plate and the thread bolt.

10. The jack bracket of claim 9, wherein the thread bolt includes the head and a rod extending from the head, the rod includes a thread portion, and a first stop and a second stop between the head and the thread portion, the elastic member being disposed between the first stop and the second plate portion, the second plate portion being disposed between the elastic member and the second stop.

11. The jack bracket of claim 10, wherein the first stop is an enlarged portion and the second stop is a clip pin or a clip ring, and the first plate portion is substantially perpendicular to the second plate portion.

12. The jack bracket of claim 5, wherein the first arm and the second arm are made from metal material and the flexible strap is made from nylon.

13. The jack bracket of claim 8, wherein the head of the thread bolt further includes a pair of wings and a torque slot between the pair of wings.

14. A jack bracket for a vehicle, comprising:
a bracket base including a first side and second side opposite the first side;
a first arm extending from the first side of the bracket base in a height direction;
a second arm extending from the second side in the height direction and opposite the first arm;
a flexible strap, wherein the flexible strap includes a first end portion connected to the first arm, a second end portion opposite the first end portion, a first surface that is an inner surface if a jack is secured, a second surface opposite the first surface, and a connection member disposed on the second surface; and
a lock assembly for coupling the second end portion of the flexible strap to the second arm of the bracket base;
wherein the flexible strap is attached to a vehicle part opposite the first arm via the connection member when the jack is removed or installed to facilitate installation and removal of the jack.

15. The jack bracket of claim 14, wherein the connection member is a hook part of a hook-and-loop fastener, or a protrusion or a recessed part of a clip connector, and configured to connect with a corresponding loop part of the hook-and-loop fastener or a corresponding recessed part or a protrusion of the clip connector on the vehicle part.

16. The jack bracket of claim 14, further comprising a support disposed on the bracket base, wherein the support is made from foam and defines a profile of an outer surface of the support that has a contour corresponding to sides of the jack.

17. The jack bracket of claim 14, wherein the lock assembly includes a thread bolt connected to the second end portion of a flexible strap, a thread hole on the second arm, a connection plate to couple the thread bolt to the second end portion of the flexible strap, and an elastic member between the connection plate and the thread bolt to provide pretension for the flexible strap.

18. A vehicle, comprising:
a vehicle part having a surface extending in a height direction;
a jack bracket adjacent to the surface of the vehicle part, including:
a bracket base including a first side adjacent to the vehicle part and second side opposite the first side;
a first arm extending from the first side of the bracket base in a direction substantially along the height direction and adjacent to the surface of the vehicle part; and
a second arm extending from the second side of the bracket base in the direction substantially along the height direction and opposite the first arm;
a flexible strap that includes a first end portion connected to the first arm, a second end portion opposite the first end portion, a first surface facing a jack in a use position and a second surface opposite the first surface, and a connection member disposed on the second surface, wherein the connection member is selectively attached to and released from the vehicle part; and
a lock assembly to couple the second end portion of the flexible strap to the second arm of the bracket base;
wherein the flexible strap is connectable to the vehicle part via the connection member in the use position or if the jack is taken from the jack bracket, the flexible strap being releasable from the surface of the vehicle part that secures the jack.

19. The vehicle of claim 18, wherein the vehicle part is a rear trim panel, the connection member is a hook part of a hook-and-loop fastener, and the surface of the rear trim panel includes a loop part of the hook-and-loop fastener such that the hook part is released from the loop part under an external force.

20. The vehicle of claim 18, wherein the lock assembly includes a thread bolt connected to the second end portion of the flexible strap and a thread hole disposed on the second arm, and an elastic member connected with the thread bolt.

* * * * *